United States Patent Office 3,122,468
Patented Feb. 25, 1964

3,122,468
PRODUCTION OF RESIN-BONDED WATER-LAID BOARDS
John E. Cadotte, Cloquet, Minn., assignor to Wood Conversion Company, St. Paul, Minn., a corporation of Delaware
No Drawing. Filed Aug. 7, 1961, Ser. No. 129,544
7 Claims. (Cl. 162—165)

The present invention relates generally to water-laying board-forming particles incorporated in a slurry containing thermosetting resin for bonding the particles to board form. In particular, it relates to the manner in which the resin is incorporated in the slurry.

The manufacture of boards from slurries varies widely with respect to the particles to form the board. Such slurries may be water suspensions of vegetable fibers, mineral fibers, and particles of wood or of mineral such as expanded vermiculite, or various mixtures of these materials, so long as there is sufficient binder to integrate the fibers or particles. The invention will be explained by reference to the use of fibers, but it is to be understood that by detailed reference to fibers there is no intention so to limit the invention.

Heretofore, it has been known to form an aqueous slurry containing fibers and dissolved or dispersed resin, the latter intended to be retained with the fibers after draining away free water and squeezing residual water from the drained mat. In this process, more resin is supplied to the slurry than is retained in the mat because an appreciable fraction is lost in the white water, that is, the water drained and squeezed from the matted fiber.

Starch sol is also used as a binder in the slurry and likewise, some of it is drained away. The present economics are such that the loss of starch can be tolerated, but the loss of resin becomes an important cost factor to be considered and minimized or avoided.

Resin bond is more desirable than starch bond, especially with respect to the water-resistance of a bonded board. The mixing of resin with starch for bonding increases the water-resistance beyond that of starch alone.

Fiberboards predominating in mineral fibers and bonded by starch under some conditions are not adequately stable at high humidity. For example, mineral fiber tile or panels, even as large as 2 x 4 feet, are commonly mounted in ceilings by suspending them from their edges. In an atmosphere of high humidity, the starch bond yields slightly and permits such a panel to sag. It has been found that by replacing some to all of the starch binder by thermoset resin binder, the tendency to sag is lessened in the direction of increase of resin content.

Accordingly, one purpose of the invention is to minimize the tendency of fiberboards to sag.

Another object is to utilize thermosetting resin binder in various fiberboards and particle boards in a more efficient manner and with less waste.

A particular object is to provide a new form of resin binder.

These objectives of the present invention are achieved by entering the resin into the fiber or particle slurry in a new form, in which form it is more efficient and is not subject to appreciable loss in the white water.

The present invention is carried out by using finely divided carrier particles on which the resin is carried, and using the resin-carrying particles in the slurry as a portion or as all of the added binder for the content of fibers or particles.

Many substances are available as carriers, but only finely divided substances which will disperse in the water are suitable, so that they may be distributed throughout the deposited mat to be effective as a bond. The size of the carrier is such that it is retained in the mat when dewatering the slurry. I have found that natural clays are economically suitable carriers, although other particle form materials may be used, such as starch grains, walnut shell flour, powdered Vinsol, wood flour silica, gypsum, talc, diatomaceous earth, and the like. Among the clays are kaolin, attapulgite, and bentonite. The particle size may fall in a wide range, for example, clays of 0.2 micron size may be used, as well as infusorial earth, which is retained on a 100-mesh screen (openings of 149 microns). Not only are the clays readily retained by the mat, but they are readily dispersed and they have a high specific surface on which to carry the resin.

The invention is carried out by use of a resin such that it naturally deposits on clay particles or is amenable to precipitation in an aqueous medium by a small amount of a flocculating agent. The deposition or precipitation is carried out in the presence of a natural clay homogeneously dispersed in the aqueous medium. To effect and maintain the dispersion of the carrier, which is preferably clay, agitation is required. Aqueous dilution of some water-dissolved resins tends to emulsify the resin, and emulsified resin is difficult to deposit on clay particles. Consequently, the deposition is best accomplished with a water solution of the resin by adding it to the agitated water-suspension of clay or other carrier in which a flocculating agent is already present as in Example 1A below. In Example 1C the flocculating agent was added after the resin.

Among the flocculating agents are organic and inorganic compounds. Organic compounds, such as polyacrylamide, are available but relative more costly than inorganic compounds of polyvalent metals, such as the relatively inexpensive soluble compounds of calcium, barium, strontium, magnesium and aluminum. Others, such as iron salts, are less preferred because of attendant color. Alum, calcium chloride, calcium hydroxide, magnesium sulfate, magnesium chloride and the like, are readily available and need be used in only a small amount. Another agent which is avaliable and which more or less inherently limits its effective amount is gypsum, which is calcium sulfate and is characterized by a limited solubility in water. Gypsum is the preferred agent for an excess of it is not effective, and the effective amount of it may be controlled by the quantity of water and its temperature which is used when precipitating the resin on the carrier, which may be an undissolved excess of gypsum.

Since the small amount of gypsum which is effective is not critical, and may be varied, the new binder composition may be easily and quickly prepared by adding the resin to a water suspension of the chosen clay and gypsum.

*Example 1.*—A water-soluble phenol-formaldehyde resin at 65% solids by weight, having a viscosity in the range from 1000 to 6000 centipoises at 70° F., is the preferred resin for the process. The following compositions illustrate the invention.

TABLE I

| Composition | Parts by Weight | | | |
|---|---|---|---|---|
| | A | B | C | D |
| Water | 31.6 | 31.6 | 31.6 | 31.6 |
| Gypsum | 1 | 0 | ¹1 | 0 |
| Kaolin | 10 | 10 | 10 | 0 |
| Resin ² (dry solids) | 10 | 10 | 10 | 10 |

¹ The gypsum was added after the resin was added to the clay and water.
² Phenol-formaldehyde resin at 1300 cps.

The above compositions were used as binder for a mineral fiber furnish as follows:

|  | Parts by weight |
|---|---|
| Rock wool | 95 |
| Amosite fiber | 5 |
| Resin (dry basis) | 10 |
| Water | 3500 |

In a normal dewatering process, the four slurries were converted to wet mats and dried to boards of comparable density, and the boards were evaluated as follows:

TABLE II

| Binder Composition | Modulus of Rupture, lbs./sq. in. | | Percent Resin Retained |
|---|---|---|---|
|  | Dry Board | After 2 Hours water soak |  |
| A | 161 | 114 | 68.6 |
| B | 73 | 1.5 | 17.7 |
| C | 14.9 | 10.2 | 29.5 |
| D | 81.3 | 65.0 | 39.7 |

In using composition B, there was little tendency to retain the resin, the board was weak and had poor water-resistance, both due to loss of resin. In using composition C, there was only slight improvement over not using gypsum. Composition A yielded a strong board with excellent water-resistance and excellent retention.

Composition D represents use of the same resin in the prior art manner as an ingredient of the slurry, without clay or gypsum. Although the retention of resin is fair, particle is trapped. Coarser clay particles are better trapped than finer ones. Without clay, the retained resin is wastefully located on fibers between fiber contacts, accounting for its inefficient use and the lower strength. The more the resin is localized by the clay, the greater the strength of the board.

*Example 2.*—Another binder composition is as follows:

|  | Parts by weight |
|---|---|
| Water | 50 |
| Gypsum | 1.6 |
| Clay [1] | 16 |
| Resin (dry solids) | 15.7 |

[1] The clay may be bentonite, non-swelling diatomaceous earth, kaolin, and the like.

In general, the composition is best made with about equal parts of clay and resin solids, and when the flocculating agent is gypsum, it is present in amount of about 1 part to 10 parts of the clay.

Other binder compositions are as follows:

*Examples 3 to 8.*—97 parts by weight of slag wool fiber and 3 parts of asbestos fiber were slurried in water at 3% fiber content. Various binder compositions were made and added immediately before dewatering to form a felt which was then dried at 310° F. to a rigid board. The rate of drainage in a standardized procedure is measured. The board density was recorded, and its modulus of rupture when dry and after soaking in water for two hours was determined. The percentage of used resin retained in the board was also recorded. These values and the binder composition are given in Table III. In each of the examples, the resin was added to the aqueous composition containing the mineral particles listed.

TABLE III

| Example | Binder | | Rate of Drainage | Density, lbs./cu.ft. | MR, lbs./in.² | | Percent Resin Retained |
|---|---|---|---|---|---|---|---|
|  | Parts by Weight | Ingredients |  |  | Dry | Wet |  |
| 3 | 1 | Gypsum | 35 | 19.9 | 112 | 83.5 | 49.8 |
|  | 10 | Resin No. 1 (as solids) |  |  |  |  |  |
|  | | (Added separately to slurry) |  |  |  |  |  |
| 4 | 1 | Gypsum | 16 | 21.4 | 23.7 | 14 | 47 |
|  | 10 | Resin No. 1 (as solids) |  |  |  |  |  |
|  | 10 | Kaolin |  |  |  |  |  |
|  | | (Added separately to slurry) |  |  |  |  |  |
| 5 | 46.5 | Water | 9.2 | 22 | 174 | 114 | 78 |
|  | 1 | Gypsum |  |  |  |  |  |
|  | 10 | Resin No. 1 (as solids) |  |  |  |  |  |
|  | 10 | Kaolin |  |  |  |  |  |
|  | | (Prepared and added to slurry) |  |  |  |  |  |
| 6 | 1 | Calcium chloride | 11 | 19.5 | 127 | 87.5 | 48 |
|  | 10 | Resin No. 2 |  |  |  |  |  |
|  | 0.04 | Polyacrylamide |  |  |  |  |  |
|  | | (Added separately to slurry) |  |  |  |  |  |
| 7 | 1 | Calcium chloride | 10 | 21.8 | 131 | 80 | 52.5 |
|  | 10 | Resin No. 2 |  |  |  |  |  |
|  | 10 | Kaolin |  |  |  |  |  |
|  | 0.04 | Polyacrylamide |  |  |  |  |  |
|  | | (Added separately to slurry) |  |  |  |  |  |
| 8 | 46.5 | Water | 10.15 | 22.4 | 187 | 127 | 61 |
|  | 1 | Calcium chloride |  |  |  |  |  |
|  | 10 | Resin No. 2 |  |  |  |  |  |
|  | 10 | Kaolin |  |  |  |  |  |
|  | | (Above prepared and added to slurry) then added. |  |  |  |  |  |
|  | 0.04 | Polyacrylamide |  |  |  |  |  | and even better than with compositions B and C in this set of experiments, it is wastefully employed as bond, and therefore, inefficiently used, as evidenced by the lower strengths dry and wet.

The foregoing data was secured in laboratory test equipment in which the forces inducing dewatering are more forceful and in which the dewatering is more quickly accomplished. In commercial mill operations the mat drains for a longer time at a less dense condition and as a result, the percent retention of resin in a case comparable to that with composition D is less than obtains in the laboratory.

In using the clay-carried resin, the clay particles localize the resin at the fiber junctions where the clay Resin No. 1 is a phenol-formaldehyde resin in water solution at 50.8% solids and at 750 centipoises.

Resin No. 2 is a trimethylol melamine-formaldehyde resin as a dry powder, which forms a gummy mass on adding to cold water. It is soluble in a small amount of water and precipitates on further dilution with water. When a solid such as clay is suspended in the water, the resin uniformly coats the solid without need of a flocculating agent to form a stable suspension.

In Table III Examples 5 and 8 are the only ones in which the resin is precipitated onto the clay before adding the clay to the furnish or slurry, and these examples produce the higher dry and wet strengths. The polyacrylamide is a flocculating agent used particularly to precipitate the suspended clay particles with the carried resin, onto the fibers in the slurry to assist in retaining resin.

Resorcinol-formaldehyde resins may be flocculated onto solids such as clay to provide binder, but are undesirable for use with fibers which form wet mats dried at elevated temperature. The resin sets too quickly before the fibers dry. However, such binder compositions may be used with fiber mats, especially mineral fiber mats dried at ordinary temperatures, and then heated to set the resin.

*Examples 9 to 15.*—A slurry of 97.5 parts of rock wool fiber and 2.5 parts of asbestos fiber was formed at 3% solids content. Binder compositions were made with 10 parts of various carriers, 1 part of gypsum and 10 parts of resin solids of an aqueous pheonl formaldehyde solution at 800–1000 centipoises. Boards were formed and tested as described above, and the wet and dry strengths reported in Table IV.

TABLE IV

| Example | Carrier | MR (lbs./in.²) | |
|---|---|---|---|
| | | Dry | Wet |
| 9 | Kaolin | 158.5 | 135 |
| 10 | Attapulgite | 112 | 81 |
| 11 | Calcium bentonite | 96 | 56 |
| 12 | Gypsum | 97 | 48 |
| 13 | Talc | 147 | 109 |
| 14 | Diatomaceous earth 325 Mesh | 170 | 147.5 |
| | Walnut shell flour | 25 | 19 |
| 15 | Corn starch grains | 98 | 76 |

*Examples 16 to 18.*—A slurry of 97.5 parts of rock wool, 2.5 parts of asbestos, and 15 parts of tapioca starch at 3% fiber content was made and to it was added the "additive" of Table V. Boards were made as described and tested for sag in 48 hours at 98% relative humidity, when the boards were suspended from their edges.

TABLE V

| Example | Additive | Sag in Inches |
|---|---|---|
| 16 | None (control) | 0.134 |
| 17 | 3 parts Resin No. 1<br>1 part alum | 0.025 |
| 18 | Prepared Composition:<br>11.7 parts water<br>0.3 parts gypsum<br>3 parts kaolin<br>3 parts Resin No. 1 | 0.007 |

*Examples 19 to 23.*—A slurry was formed at 3% solids content of 97.5 parts rock wool fiber and 2.5 parts of asbestos. To it were added before dewatering the "additive" of Table VI. Boards were formed as described and tested for wet and dry strength as given below:

TABLE VI

| Example | Parts | Additive | MR (lbs./in.²) | |
|---|---|---|---|---|
| | | | Dry | Wet |
| 19 | 46<br>1<br>10<br>10 | Water<br>Calcium chloride<br>Kaolin<br>Resin No. 2 | 174 | 123 |
| | Followed in slurry by 0.04 polyacrylamide | | | |
| 20 | Same as Example 19 omitting polyacrylamide. | | 216 | 139 |
| 21 | Same as Example 19 omitting calcium chloride. | | 179 | 131.5 |
| 22 | Same as Example 19 substituting diatomaceous earth for kaolin. | | 172.5 | 114.5 |
| 23 | 10 | Resin No. 2 | 126 | 132.5 |

From the foregoing examples it is clear that the resin provides better bond, and hence, strength when it is first flocculated onto a carrier which localizes the resin at a point of entrapment, which point assures that the resin functions where two or more fibers touch or are sufficiently close together to trap the particle. Thus, resin is not wasted at regions of fibers between fiber contacts.

I claim:

1. The method of forming an aqueous dispersion of carrier particles coated with a thermosetting resin which comprises suspending carrier particles in water containing a flocculating agent dissolved in the water of said suspension and then depositing said resin on the particles by adding dissolved water-soluble resin to the resulting suspension, the amounts of resin solids and of carrier particles being approximately the same.

2. The method which comprises adding an aqueous solution of phenol-formaldehyde resin to an aqueous suspension of carrier particles which suspension contains polyvalent metal ions as a flocculating agent for said resin, and thereby precipitating said resin as coatings on the dispersed carrier particles, the amounts of resin solids and of carrier particles being substantially the same.

3. The method of claim 2 in which the carrier particles are clay.

4. The method of claim 2 in which the carrier particles comprise undissolved gypsum in the suspension whereby to assure the presence of dissolved gypsum as the flocculating agent.

5. The method of claim 2 in which the carrier is clay and the flocculating agent is gypsum in quantity of about 1 part to 10 parts of clay.

6. In the method of making a rigid board by drying a wet mat formed by dewatering an aqueous suspension of board-forming particles which suspension contains binder therefor, the improvement which comprises suspending a quantity of carrier particles in water and dissolving a flocculating agent in said water, then depositing resin as coatings on said carrier particles by adding to the water containing said particles and said flocculating agent substantially an equal quantity of thermosetting resin dissolved in aqueous solution, adding the resulting suspension of resin-coated particles to said suspension of board-forming particles to function as binder, and thermosetting the resin by drying the wet mat at a thermosetting temperature.

7. The method of claim 6 in which the board-forming particles predominate in mineral fibers.

References Cited in the file of this patent

UNITED STATES PATENTS

| 1,901,382 | Stevenson | Mar. 14, 1933 |
| 2,225,100 | Clapp | Dec. 17, 1940 |
| 2,732,285 | Hollenberg | Jan. 24, 1956 |
| 2,887,431 | Piersol | May 19, 1959 |

UNITED STATES PATENT OFFICE
CERTIFICATE OF CORRECTION

Patent No. 3,122,468                                  February 25, 1964

John E. Cadotte

It is hereby certified that error appears in the above numbered patent requiring correction and that the said Letters Patent should read as corrected below.

Column 2, line 33, for "relative" read -- relatively --; column 6, line 55, for "2,732,285" read -- 2,732,295 --.

Signed and sealed this 30th day of June 1964.

(SEAL)
Attest:

ERNEST W. SWIDER                                      EDWARD J. BRENNER
Attesting Officer                                          Commissioner of Patents